United States Patent
Lin et al.

(10) Patent No.: US 8,526,413 B2
(45) Date of Patent: Sep. 3, 2013

(54) CONCATENATING PRECODER SELECTION FOR OFDMA-BASED MULTI-BS MIMO

(75) Inventors: Chih-Yuan Lin, Wujie Township, Yilan County (TW); Pei-Kai Liao, Mingjian Xiang (TW)

(73) Assignee: Mediatek Inc. (TW)

( * ) Notice: Subject to any disclaimer, the term of this patent is extended or adjusted under 35 U.S.C. 154(b) by 417 days.

(21) Appl. No.: 12/924,632

(22) Filed: Oct. 1, 2010

(65) Prior Publication Data

US 2011/0080901 A1    Apr. 7, 2011

Related U.S. Application Data

(60) Provisional application No. 61/247,993, filed on Oct. 2, 2009, provisional application No. 61/255,171, filed on Oct. 27, 2009.

(51) Int. Cl.
*H04B 7/208* (2006.01)

(52) U.S. Cl.
USPC ............................................. 370/344

(58) Field of Classification Search
None
See application file for complete search history.

(56) References Cited

U.S. PATENT DOCUMENTS

| | | | | |
|---|---|---|---|---|
| 6,337,985 | B1 * | 1/2002 | Roux et al. ............... | 455/442 |
| 2009/0215480 | A1 * | 8/2009 | Kim et al. ................. | 455/501 |
| 2010/0309998 | A1 | 12/2010 | Jung et al. ................ | 375/260 |
| 2011/0128917 | A1 * | 6/2011 | Ko et al. ................... | 370/328 |
| 2011/0151918 | A1 * | 6/2011 | Seo et al. .................. | 455/522 |

FOREIGN PATENT DOCUMENTS

| | | |
|---|---|---|
| CN | 102239646 A | 8/2008 |
| CN | 101272364 A | 9/2008 |
| CN | 101369871 A | 2/2009 |
| KR | 1020090066198 | 10/2009 |
| WO | WO2009084903 A2 | 7/2009 |

OTHER PUBLICATIONS

International Search Report and Written Opinion of International Search Authority for PCT/CN2010/077582 dated Jan. 13, 2011 (11 pages).
SIPO, Examination Report of the Chinese patent application 201080002382.1 dated Feb. 7, 2013 (4 pages).

* cited by examiner

*Primary Examiner* — John Blanton
(74) *Attorney, Agent, or Firm* — Zheng Jin

(57) ABSTRACT

A method of concatenating precoder selection is provided for OFDMA-based multi-BS multiple-input multiple-output (MIMO). A cell-edge mobile station first determines a precoding matrix indexes (PMIs) for a serving base station and one or more cooperative base stations to optimize system performance. The mobile station then determines a plurality of corresponding weight factors for each of the base stations to further optimize system performance. The mobile station recommends the selected PMIs and weight factors to the serving base station, which shares the PMIs and weight factors with the cooperative base stations. Each base station then applies precoding using the recommended PMIs and weight factors. The weight factors are quantized to reduce computation complexity and to facilitate information feedback. In one embodiment, the weight factors are determined based on a pre-defined 3-bit uniform phase quantization rule. The concatenated precoder leads to large performance gain without introducing high computation complexity.

20 Claims, 5 Drawing Sheets

METHOD OF DETERMINING PRECODING WEIGHT FOR MULTI-BS MIMO IN A CELLULAR OFDMA SYSTEM

METHOD OF DETERMINING PRECODING WEIGHT FOR
MULTI-BS MIMO IN A CELLULAR OFDMA SYSTEM

| BIT | $\alpha_i$ |
|---|---|
| 0 .. 00 | $n_0$ |
| 0 .. 01 | $n_1$ |
| ⋮ | ⋮ |
| 1 .. 11 | $n_{2^N-1}$ |

FIG. 3A

| BIT | b |
|---|---|
| 0 .. 00 | 0 |
| 0 .. 01 | $1/2^N$ |
| ⋮ | ⋮ |
| 1 .. 11 | $(2^N-1)/2^N$ |

FIG. 3B

| a | b |
|---|---|
| $n_0$ | 0 |
| $n_0$ | $1/2^{M2}$ |
| ⋮ | ⋮ |
| $n_0$ | $(2^{M2}-1)/2^{M2}$ |
| ⋮ | ⋮ |
| $n_{2^{M1}-1}$ | 0 |
| $n_{2^{M1}-1}$ | $1/2^{M2}$ |
| ⋮ | ⋮ |
| $n_{2^{M1}-1}$ | $(2^{M2}-1)/2^{M2}$ |

FIG. 3C

| BIT | $[\alpha_0, \alpha_1, \alpha_2]$ |
|---|---|
| 0 .. 00 | $[\,e^{j2\pi b_{0,0}}\ \ e^{j2\pi b_{0,1}}\ \ e^{j2\pi b_{0,2}}\,]$ |
| 0 .. 01 | $[\,e^{j2\pi b_{1,0}}\ \ e^{j2\pi b_{1,1}}\ \ e^{j2\pi b_{1,2}}\,]$ |
| ⋮ | ⋮ |
| 1 .. 11 | $[\,e^{j2\pi b_{2^M-1,0}}\ \ e^{j2\pi b_{2^M-1,1}}\ \ e^{j2\pi b_{2^M-1,2}}\,]$ |

FIG. 3D

| INDEX/BIT | b | α PHASE |
|---|---|---|
| 0/00 | 0 | 0 |
| 1/01 | 1/4 | 90 |
| 2/10 | 2/4 | 180 |
| 3/11 | 3/4 | 270 |

FIG. 4A

| INDEX/BIT | b | α PHASE |
|---|---|---|
| 0/000 | 0 | 0 |
| 1/001 | 1/8 | 45 |
| 2/010 | 2/8 | 90 |
| 3/011 | 3/8 | 135 |
| 4/100 | 4/8 | 180 |
| 5/101 | 5/8 | 225 |
| 6/110 | 6/8 | 270 |
| 7/111 | 7/8 | 315 |

FIG. 4B

| FFT size | 512 (24 PRUs) |
|---|---|
| Number of BSs | 3 |
| Number of transmit antennas for each BS | 4 |
| Number of receive antennas of MS | 2 |
| Channel model | PB 3 km/hr |
| Channel estimation | 2D-MMSE |
| Receive SNR | 0 dB |
| Receiver type | MRC |
| Feedback period | subband PMI and phase are updated every 10 ms |
| DL joint processing type | Rank-1 CL MD |
| Codebook type | 4-antenns CL SU-MIMO subset |

FIG. 5

CONCATENATING PRECODER SELECTION FOR OFDMA-BASED MULTI-BS MIMO

CROSS REFERENCE TO RELATED APPLICATIONS

This application claims priority under 35 U.S.C. §119 from U.S. Provisional Application No. 61/247,993, entitled "Concatenating Precoder Selection for OFDMA-Based Multi-BS MIMO," filed on Oct. 2, 2009; U.S. Provisional Application No. 61/255,171, entitled "Multi-BS Phase Codebook Design," filed on Oct. 27, 2009; the subject matter of which is incorporated herein by reference.

TECHNICAL FIELD

The disclosed embodiments relate generally to wireless network communications, and, more particularly, to precoder selection for orthogonal frequency division multiple access (OFDMA) systems with multi-BS multiple-input multiple-output (MIMO).

BACKGROUND

In wireless communications, multiple-input and multiple-output (MIMO) technology involves the use of multiple antennas at both the transmitter and receiver to improve communication performance. MIMO technology offers significant increases in data throughput and link range without additional bandwidth or transmit power via higher spectral efficiency and link reliability or diversity. One of the common functions in MIMO technology is precoding, which is a type of beamforming that leverages spatial diversity. In single-layer beamforming, the same signal is emitted from each of the transmit antennas with appropriate phase and/or gain weighting such that the signal power is maximized at the receiver input. The benefits of beamforming are to increase the received signal gain, by making signals emitted from different antennas add up constructively, and to reduce the multipath fading effect. When the receiver has multiple antennas, the transmit beamforming cannot simultaneously maximize the signal level at all of the receive antennas, and multi-layer beamforming is used. In general, precoding requires knowledge of channel state information (CSI) at the transmitter. MIMO technology is typically combined with orthogonal frequency division multiplexing (OFDM) or orthogonal frequency division multiple access (OFDMA) modulation in wireless communication systems.

In addition to spatial diversity, macro-diversity is another kind of diversity scheme where several receiver antennas and/or transmitter antennas are used for transferring the same signal. With macro-diversity, the distance between the transmitters is much longer than the wavelength, as opposed to micro-diversity where the distance is in the order of or shorter than the wavelength. Therefore, in a cellular network, macro-diversity implies that the antennas are typically situated in different base stations. The aim of macro-diversity is to combat fading and to increase the received signal strength and signal quality in exposed positions (i.e., cell-edge) in between the base stations.

To improve network throughput, especially cell-edge throughput, multi-BS MIMO techniques are supported in cellular OFDM/OFDMA networks. With multi-BS MIMO, all neighboring base stations cooperate with each other and use the same configuration such as modulation and coding scheme (MCS) level, MIMO configuration, and other system parameters. Antennas from all neighboring base stations thus act like a "big" MIMO. While each base station uses precoding to leverage spatial diversity, mobile stations located at cell-edge enjoy macro-diversity by multi-BS collaborative precoding. Precoder selection, however, remains as a challenge in multi-BS MIMO because signals from different base stations are not always coherently combined. Solutions are sought to compensate phase and amplitude differences among signals from cooperative base stations such that the received signal strength and quality can be maximized.

SUMMARY

A method of concatenating precoder selection is provided for OFDMA-based multi-BS multiple-input multiple-output (MIMO). A cell-edge mobile station first determines precoding matrix indexes (PMIs) for a serving base station and one or more cooperative base stations to optimize system performance. The optimization criteria are based on capacity maximization, SINR maximization, or signal power maximization etc. The mobile station then determines a plurality of corresponding weight factors for each of the base stations to further optimize system performance. The mobile station recommends the selected PMIs and weight factors to the serving base station, which shares the PMIs and the weight factors with at least one of the cooperative base stations. If the feedback information is adopted by the base stations, then the serving base station and at least one of the cooperative base stations apply precoding using the recommended PMIs and weight factors.

The weight factors are quantized based on a pre-defined quantization rule to reduce computation complexity of the mobile station. The weight factors are also quantized to facilitate information feedback from the MS to its serving BS. In one embodiment, the weight factors are determined based on a pre-defined 3-bit uniform phase quantization rule. The novel concatenated precoder leads to large performance gain without introducing high computation complexity. Using the novel concatenated precoder, the mobile station can avoid exhaustive search to find the PMIs by joint optimization and instead use individual optimization to reduce computation complexity. The mobile station then uses weight factors to adjust the signal phase of each base station and let the signals from the cooperative base stations be coherently combined to maximize received signal power.

Other embodiments and advantages are described in the detailed description below. This summary does not purport to define the invention. The invention is defined by the claims.

BRIEF DESCRIPTION OF THE DRAWINGS

FIGS. 3A-3D illustrate different quantization rules of determining weight factors in concatenated precoding for multi-BS MIMO.

FIGS. 4A-4B illustrate different examples of a uniform phase quantization rule that is used in determining weight factors in concatenated precoding for multi-BS MIMO.

FIG. 5 illustrates simulation parameters for different precoding methods in multi-BS MIMO systems.

DETAILED DESCRIPTION

Reference will now be made in detail to some embodiments of the invention, examples of which are illustrated in the accompanying drawings.

Figure 1:
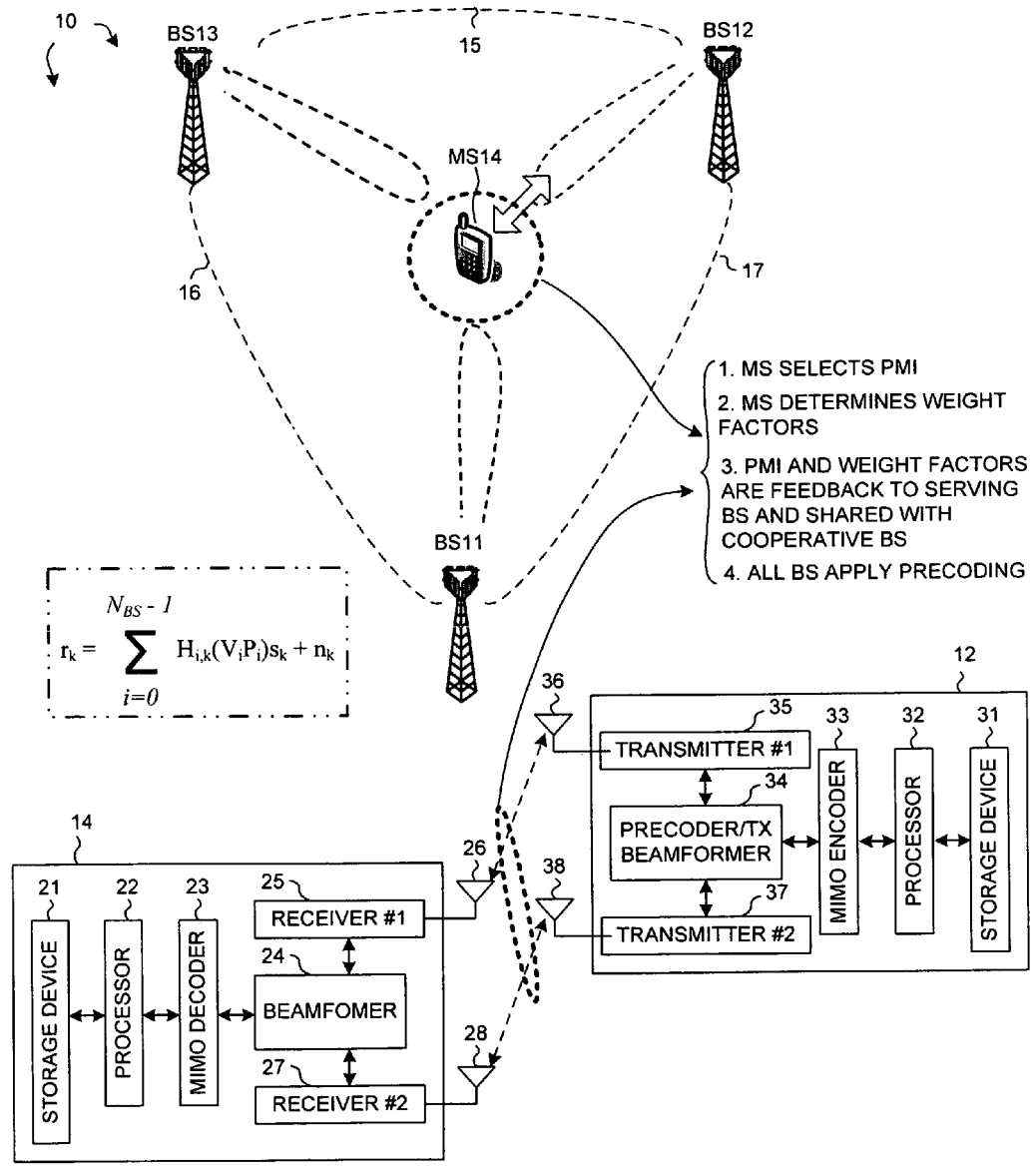
FIG. 1 illustrates a simplified block diagram of a cellular OFDMA-based multi-BS MIMO system in accordance with one novel aspect.

FIG. 1 illustrates a simplified block diagram of a cellular OFDMA-based multi-BS MIMO system 10 in accordance with one novel aspect. Cellular OFDMA system 10 comprises a plurality of neighboring base stations BS11-BS13 and a mobile station MS14. Base stations BS11-BS13 are connected to each other via backbone connections 15-17. MS14 is located at the cell-edge of its serving base station BS12. For downlink (DL) transmission, signals are transmitted from different base stations to mobile station MS14. On the transmit side, each base station (i.e., BS12) comprises a storage device 31, a processor 32, a multiple-input multiple-output (MIMO) encoder 33 that encodes MIMO signals, a precoding and beamforming module 34, a first transmitter#1 35 coupled to antenna 36, and a second transmitter#2 37 coupled to antenna 38. On the receive side, MS14 comprises a storage device 21, a processor 22, a MIMO decoder 23 that decodes MIMO signals, a beamforming module 24, a first receiver#1 25 coupled to antenna 26, and a second receiver#2 27 coupled to antenna 28. Because MS14 is located at the cell-edge of serving base station BS12, the received signal strength from BS12 is relatively low. Neighboring base stations BS11 and BS13 are thus used to cooperatively serve MS14 together with serving base station BS12 to increase the quality of service for MS14 via multi-BS MIMO technique.

With multi-BS MIMO, all neighboring base stations cooperate with each other and use the same configuration such as modulation and coding scheme (MCS) level, MIMO configuration, and other system parameters. Antennas from all neighboring base stations thus act like a "big" MIMO. As a result, the same signal is transmitted from different antennas of all neighboring base stations BS11-BS13 to be received by MS14. Therefore, while each base station uses precoding to achieve spatial diversity, MS14 enjoys macro-diversity by multi-BS collaborative precoding. Ideally, with proper precoder selection, the received signal strength and quality of MS14 can be maximized. The received signal $r_k$ at kth subcarrier from a total number of $N_{BS}$ neighboring base stations can be represented by the following signal model:

$$r_k = \Sigma_{i=0}^{NBS-1} H_{i,k}(V_i) s_k + n_k \quad (1)$$

where $H_{i,k} \in (N_r \times N_{t,i})$ is the channel matrix between MS and ith BS, $N_r$ is the number of MS's antennas, $N_{t,i}$ is the number of ith BS's antennas $V_i \in (N_{t,i} \times N_s)$ is the precoder matrix of ith BS, $N_s$ is the number of streams, and $1 \leq N_s \leq N_r$ $s_k$ is the transmit signal at kth subcarrier $n_k$ is the noise at kth subcarrier Signals from different base stations, however, are not always coherently combined. Under certain scenarios, signals from different base stations are destructive to each other and thus lead to performance degradation. In one novel aspect, the precoder selection using equation (1) involves two concatenated steps. In a first step, a precoder matrix $V_i$ (also referred to as Precoding Matrix Index (PMI)) for each base station is selected to largely leverage spatial diversity. In a second step, a weight matrix Pi for each base station is selected to maximally reduce negative effect of non-coherent signal combination. The selected PMIs and weight factors are then feedback to the serving base station, which shares the information with other cooperative base stations. If the feedback information is adopted, then the base stations apply precoding based on the recommended PMIs and weight factors. The revised signal model under the concatenated precoding method becomes:

$$r_k = \Sigma_{i=0}^{NBS-1} H_{i,k}(V_i P_i) s_k + n_k \quad (2)$$

where $H_{i,k} \in (N_r \times N_{t,i})$ is the channel matrix between MS and ith BS, $N_r$ is the number of MS's antennas, $N_{t,i}$ is the number of ith BS's antennas $V_i \in (N_{t,i} \times N_s)$ is the precoder matrix of ith BS, $N_s$ is the number of streams, and $1 \leq N_s \leq N_r$ $P_i = \alpha_i$ or $P_i = \text{diag}\{\alpha_{i,0}, \ldots, \alpha_{i,Ns-1}\}$ is the weight matrix for ith BS, weight factors $\alpha_i$ may be real or complex ($\alpha = \alpha e^{j2\pi b}$)

Figure 2:
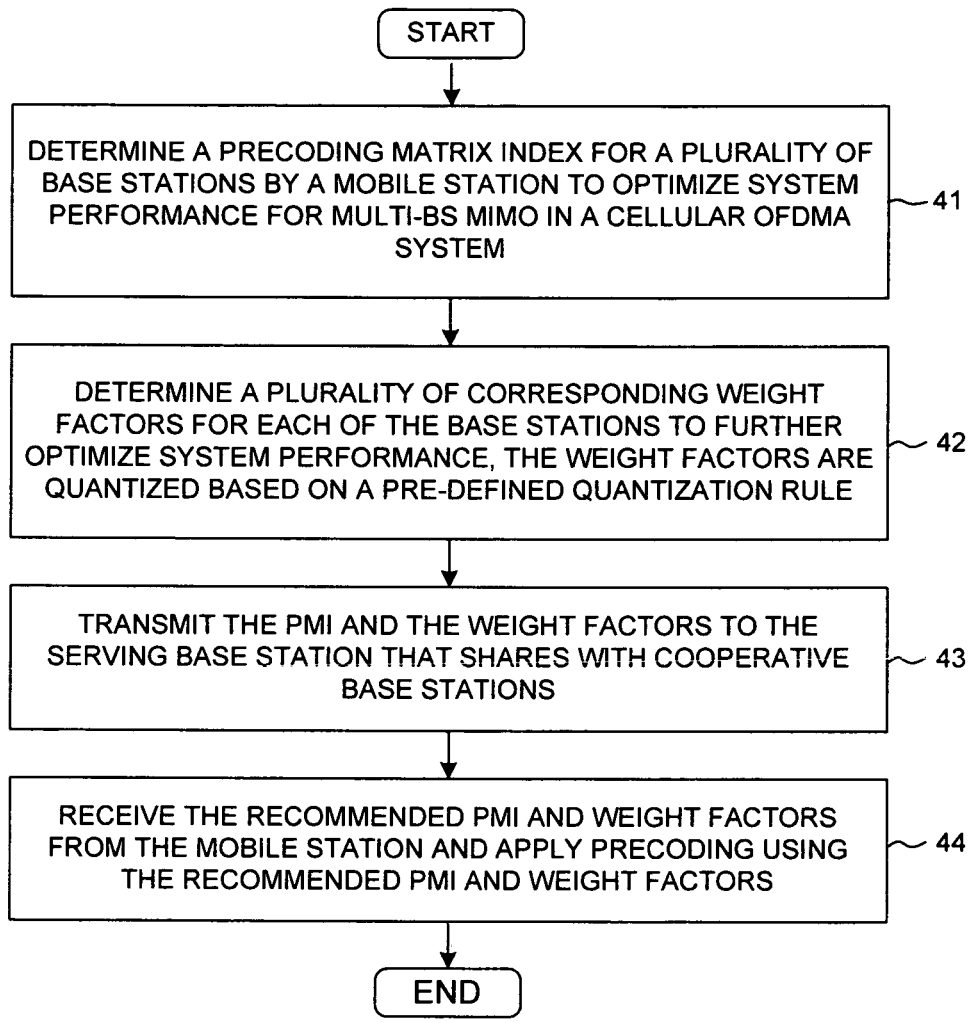
FIG. 2 illustrates a flow chart of concatenating precoder selection for multi-BS MIMO in a cellular OFDMA system in accordance with one novel aspect.

$s_k$ is the transmit signal at kth subcarrier $n_k$ is the noise at kth subcarrier FIG. 2 is a flow chart of a method of concatenating precoder selection for OFDMA-based closed-loop Multi-BS MIMO in accordance with one novel aspect. For closed-loop multi-BS MIMO, a cell-edge mobile station first estimates channels from all cooperative base stations by measuring pilot signals. After channel estimation, channel matrix H between the MS and each BS is obtained. The rest of the precoder selection process for multi-BS MIMO is divided into four phases.

In step 41 (PHASE 1—select PMIs), the MS selects precoder matrix $V_i$ (or PMIs) for ith BS via three different optimization methods. The optimization criteria are based on system performance considerations such as capacity maximization, signal to interference plus noise power ration (SINR) maximization, signal power maximization, etc. In a first method of individual optimization, the MS individually chooses the best PMI for each BS. In a second method of joint optimization, the MS jointly considers channels of all BSs and finds globally optimal PMI for each BS. In a third method of step-by-step optimization, the MS first chooses a first BS to optimize its PMI, and then chooses a second BS to optimize its PMI by considering the PMI of the first BS, and so on so forth until all PMIs for all BSs are determined.

In step 42 (PHASE 2—determine weight factors), the MS determines weight matrix $P_i$ (or weight factors) for ith BS. The weight matrix $P_i$ is chosen such that composite channel $H_{c,k} = \Sigma_{i=0}^{NBS-1} H_{i,k}(V_i P_i)$ can result in optimized system performance such as capacity maximization, SINR maximization, signal power maximization, etc. The weight matrix $P_i$ can be determined via two different optimization methods. In a first method of joint optimization, the MS finds weight factors by jointly considering channel estimations corresponding to all receive antennas. In a second method of per-antenna optimization, the MS finds weight factors by considering channel estimations corresponding to one receive antenna. Weight factors provide additional degrees-of-freedom for performance improvement.

In step 43 (PHASE 3—feedback information), the MS transmits the PMIs and weight factors to the serving BS, which shares the information with other cooperative BSs. The weight factors are quantized based on a pre-defined quantization rule to facilitate information feedback. Finally, in step 44 (PHASE 4—apply precoding), the serving BS and other cooperative BSs decide whether to adopt the PMIs and weight factors recommended by the MS. If recommendation is adopted, then all the BSs apply precoding using the latest PMIs and weight factors. Various examples and embodiments of concatenating precoder selection for multi-BS MIMO are now described below with more details.

In the following precoding design example for multi-BS MIMO, three cooperative BSs ($N_{BS}=3$) are considered, and rank-1 (Ns=1) closed-loop macro-diversity (CL-MD) is used in multi-BS MIMO. Under such system parameters, the signal model under Equation (2) can be simplified as:

$$r_k = \sum_{i=0}^{3} H_{i,k}(V_i \alpha_i) s_k + n_k \qquad (3)$$

where
- $H_{i,k} \in (N_r \times N_{t,i})$ is the channel matrix between MS and ith BS, $N_r$ is the number of MS's antennas, $N_{t,i}$ is the number of ith BS's antennas
- $V_i \in (N_{t,i} \times 1)$ is the precoder matrix of ith BS
- $\alpha_i$ is the scalar weight factor for ith BS, $\alpha_i$ may be real or complex ($\alpha e^{j2\pi b}$)
- $s_k$ is the transmit signal at kth subcarrier
- $n_k$ is the noise at kth subcarrier Under the signal model of Equation (3), the concatenated precoding selection process is divided into four phases, as described above with respect to FIG. 2. In Phase 1, a cell-edge mobile station performs PMI selection for all cooperative base stations to optimize system performance (i.e., signal power maximization). For individual optimization, the MS finds $V_i$ that maximizes $\sum_{k=0}^{N_{tone}} \|H_{i,k} V_i\|^2$, for $0 \leq i \leq 2$, where $N_{tone}$ is the number of subcarriers that use an identical precoder. The MS searches $V_i$ for each BS individually without considering the effect of other BSs. For joint optimization, the MS finds $V_i$ that maximizes $\sum_{k=0}^{N_{tone}} \|\sum_{i=0}^{2} H_{i,k} V_i\|^2$, for $0 \leq i \leq 2$. The MS exhaustively searches $V_i$ for each BS by jointly considering the effect of all cooperative BSs. For step-by-step optimization, the MS finds $V_0$ to maximize $\sum_{k=0}^{N_{tone}} \|H_{0,k} V_0\|^2$ for the first BS, where the optimal $V_0$ is denoted as $V_{0,optimal}$. Next, the MS finds $V_1$ to maximize $\sum_{k=0}^{N_{tone}} \|H_{0,k} V_{0,optimal} + H_{1,k} V_1\|^2$ for the second BS, where the optimal $V_1$ is denoted as $V_{1,optimal}$. Finally, the MS finds $V_2$ to maximize $\sum_{k=0}^{N_{tone}} \|H_{0,k} V_{0,optimal} + H_{1,k} V_{1,optimal} + H_{2,k} V_2\|^2$ for the third BS, where the optimal $V_2$ is denoted as $V_{2,optimal}$. The three different optimization methods illustrated-above have different complexity and performance. If a codebook with 16 code elements is used, then $V_i$ is searched from the 16 code elements by the MS to maximize its received signal power. For complexity point of view, the individual optimization method as well as the step-by-step optimization method requires 16×3=48 searches, while the joint optimization method requires 16×16×16=4096 searches. For performance point of view, however, the joint optimization produces the best optimization result.

In Phase 2, the MS determines weight factors $\alpha_i$ for each BS such that $\sum_{k=0}^{N_{tone}} \|\sum_{i=0}^{2} H_{i,k} V_{i,optimal} \alpha_i\|^2$ (i.e., the received signal power) is maximized. The weight factors are determined based on a pre-defined quantization rule to reduce computation complexity of the MS. The weight factors are also quantized to facilitate information feedback from the MS to its serving BS. FIGS. 3A-3D illustrate different quantization rules of determining weight factors in concatenated precoder selection for multi-BS MIMO.

In the example of FIG. 3A, a weight factor a is represented by a real number n indicating the precoding power of a base station. The signal power transmitted from each base station is adjusted based on the value of n such that different signals from different BSs are more coherently combined to produce stronger signal power. If an N-bit quantization is used to quantize the value of n range from zero to one, then each weight factor $\alpha_i$ has $2^N$ possible power values. The different power values are derived from the value of a. As illustrated in FIG. 3A, for BIT 0 ... 00, $\alpha_i = n_0$, for BIT 0 ... 01, $\alpha_i = n_1$, ..., and for BIT 1 ... 11, $\alpha_i = n_{2^N - 1}$. Thus, in order to achieve maximum received signal power, the MS needs to perform $(2^N)^3$ searches to find the best $\alpha_0, \alpha_1,$ and $\alpha_2$.

In the example of FIG. 3B, a weight factor $\alpha$ is represented by a complex number $e^{j2\pi b}$ indicating the precoding phase of a base station. The signal phase transmitted from each base station is adjusted based on the value of b such that different signals from different BSs are more coherently combined to produce stronger signal power. If an N-bit quantization is used to quantize the value of b range from zero to one, then each weight factor $\alpha_i$ has $2^N$ possible phase values. The different phase values are derived from the value of b. Similar to FIG. 3A, for BIT 0 ... 00, $\alpha_i = e^{j2\pi b_0}$ and $b_0 = 0$, for BIT 0 ... 01, $\alpha_i = e^{j2\pi b_i}$ and $b_1 = 1/2^N$, ..., and for BIT 1 ... 11, $\alpha_i = e^{j2\pi b_{2^N - 1}}$ and $b_{2^N - 1} = (2^N - 1)/2^N$. Thus, in order to achieve maximum received signal power, the MS needs to perform $(2^N)^3$ searches to find the best $\alpha_0, \alpha_1,$ and $\alpha_2$.

In the example of FIG. 3C, a weight factor a is represented by a complex number $ae^{j2\pi b}$ indicating both precoding power and precoding phase of a base station. The signal power and phase transmitted from each base station is adjusted based on the values of a, b such that different signals from different BSs are more coherently combined to produce stronger signal power. If an M1-bit quantization is used to quantize the value of a, an M2-bit quantization is used to quantize the value of b, and M=M1+M2, then each "a" has $2^{M1}$ possible power values, each "b" has $2^{M2}$ possible phase values, and each weight factor $\alpha_i$ has $2^M$ possible values. As illustrated in FIG. 3C, for each $\alpha_i$, the value of a is selected from $n_0$ to $n_{2^{M1}-1}$, and for a selected value of a, each b is further selected from 0 to $(2^{M2}-1)/2^{M2}$. Thus, in order to achieve maximum received signal power, the MS needs to perform $(2^M)^3$ searches to find $\alpha_0, \alpha_1,$ and $\alpha_2$.

In the example of FIG. 3D, weight factors $\alpha_0, \alpha_1,$ and $\alpha_2$ are determined via vector quantization. Using vector quantization, each element is N-bit quantized to form a searching space with $(2^N)^3$ search points. Among the $(2^N)^3$ search points, however, only M-bit (M<<N) vector quantization is performed to largely reduce the searching space. As illustrated in FIG. 3D, for BIT 0 ... 00, $\alpha_0 = e^{j2\pi b_{0,0}}, \alpha_1 = e^{j2\pi b_{0,1}}$, and $\alpha_2 = e^{j2\pi b_{0,2}}$; for BIT 0 ... 01, $\alpha_0 = e^{j2\pi b_{1,0}}, \alpha_1 = e^{j2\pi b_{1,1}}$, and $\alpha_2 = e^{j2\pi b_{1,2}}$; and for BIT 1 ... 11, $\alpha_0 = e^{j2\pi b_{2^M - 1,0}}, \alpha_1 = e^{j2\pi b_{2^M - 1,1}}$, and $\alpha_2 = e^{j2\pi b_{2^M - 1,2}}$. Thus, in order to achieve maximum received signal power, the MS needs to perform $(2^M)^3$ searches from the $(2^N)^3$ search space to find the best $\alpha_0, \alpha_1,$ and $\alpha_2$. The vector quantization not only reduces searching space, but also reduces the number of bits for information feedback.

In PHASE 3, the value of each weight factor is feedback from the MS to its serving base station in the format of the N quantization bits, and then shared among all cooperative BSs. Depending on the different quantization rules illustrated in FIGS. 3A-3D, the weight factors represent power and/or phase information for each neighboring BS. In PHASE 4, each neighboring BS applies fine-tuning of its precoding power and/or phase based on the received N quantization bits. In general, choice of the number of quantization bits is a tradeoff between performance and feedback overhead. FIGS. 4A-4B illustrate different examples of a phase quantization rule that is used in determining weight factors in concatenated precoder selection for multi-BS MIMO.

In the example of FIG. 4A, a 2-bit uniform phase quantization table is used for quantizing the value of b for complex weight factors $\alpha_i = e^{j2\pi b}$ in FIG. 3B. The 2-bit quantization forms a $2^2 = 4$ phase selections for each weight factor, which are derived from the value of b based on $\alpha_i = e^{j2\pi b}$. For example, for BIT 00, then $b_0 = 0$, which indicates 0 degree of phase adjustment; for BIT 01, then $b_1 = 1/4$, which indicates 90 degree of phase adjustment; for BIT 10, then $b_2 = 1/2$, which indicates 180 degree of phase adjustment; and for BIT 11, then $b_3=\frac{3}{4}$, which indicates 270 degree of phase adjustment. Because each weight factor has four possible values, the 2-bit quantization thus provides a total number of 4×4×4=64 search points for three weight factors $\alpha_0$, $\alpha_1$, and $\alpha_2$.

In the example of FIG. 4B, a 3-bit quantization table is used for quantizing the value of b for complex number $\alpha_i=e^{j2\pi b}$ in FIG. 3B. The 3-bit quantization forms a $2^3=8$ phase selections for each weight factor, which are derived from the value of b based on $\alpha_i=e^{j2\pi b}$. For example, for BIT 000, then $b_0=0$, which indicates 0 degree of phase adjustment; for BIT 001, then $b_1=\frac{1}{8}$, which indicates 45 degree of phase adjustment . . . and so on so forth until for BIT 111, then $b_7=\frac{7}{8}$, which indicates 315 degree of phase adjustment. Because each weight factor has eight possible values, the 3-bit quantization thus provides a total number of 8×8×8=512 search points for three weight factors $\alpha_0$, $\alpha_1$, and $\alpha_2$. When the number of quantization bits increases, the weight factors provide better granularity for each BS to adjust its precoding phase. System performance is thus enhanced at the cost of feedback overhead. The performance of different precoding methods for multi-BS MIMO is now illustrated below based on simulation results.

FIG. 5 illustrates simulation parameters used for different precoding methods in OFMDA-based multi-BS MIMO systems. The system parameters used for simulation are: the Fast Fourier Transfer (FFT) size is 512, the number of cooperative BSs considered is three, the number of transmit antennas for each BS is four, the number of receive antennas for the MS is two, the channel model used is pedestrian B (PB) 3 km/hr, the channel estimation model used is two-dimensional minimum mean-square error (2D-MMSE), the receive SNR is 0 dB, the receiver type is maximal ratio combining (MRC), the feedback period for updating sub-band PMI and phase is 10 ms, the downlink joint processing type is Rank-1 closed-loop macro-diversity (CL-MD), and the codebook type is 4-antennas CL single-user MIMO (SU-MIMO) subset defined in IEEE 802.16m specification.

Figure 6A:
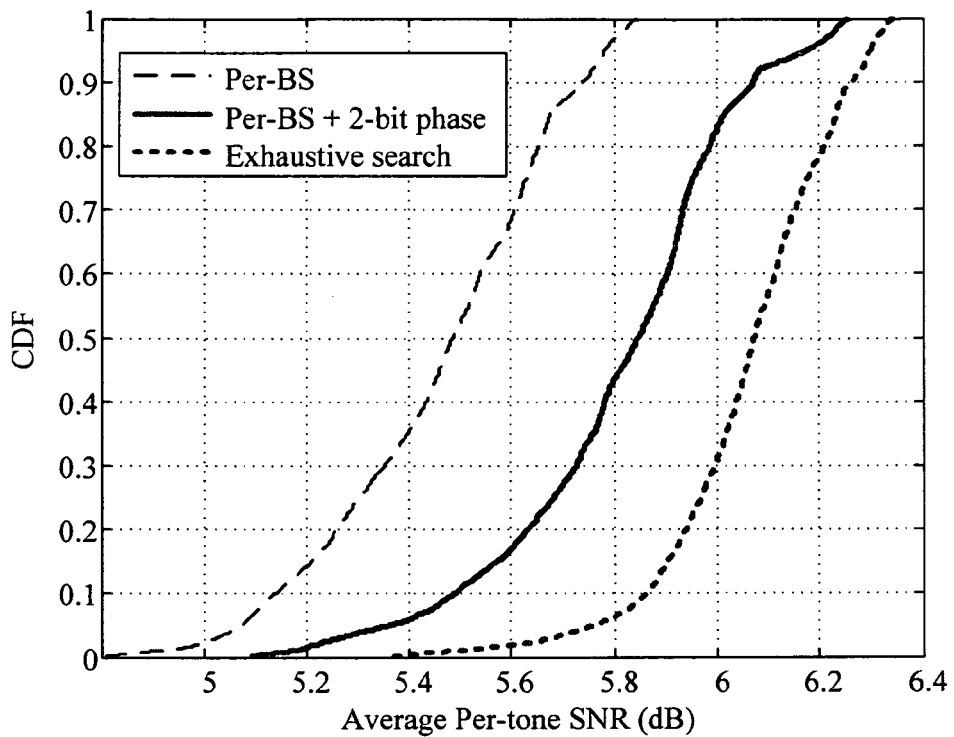
FIGS. 6A-6B illustrate simulation results for different precoding methods in multi-BS MIMO systems.
Figure 6B:
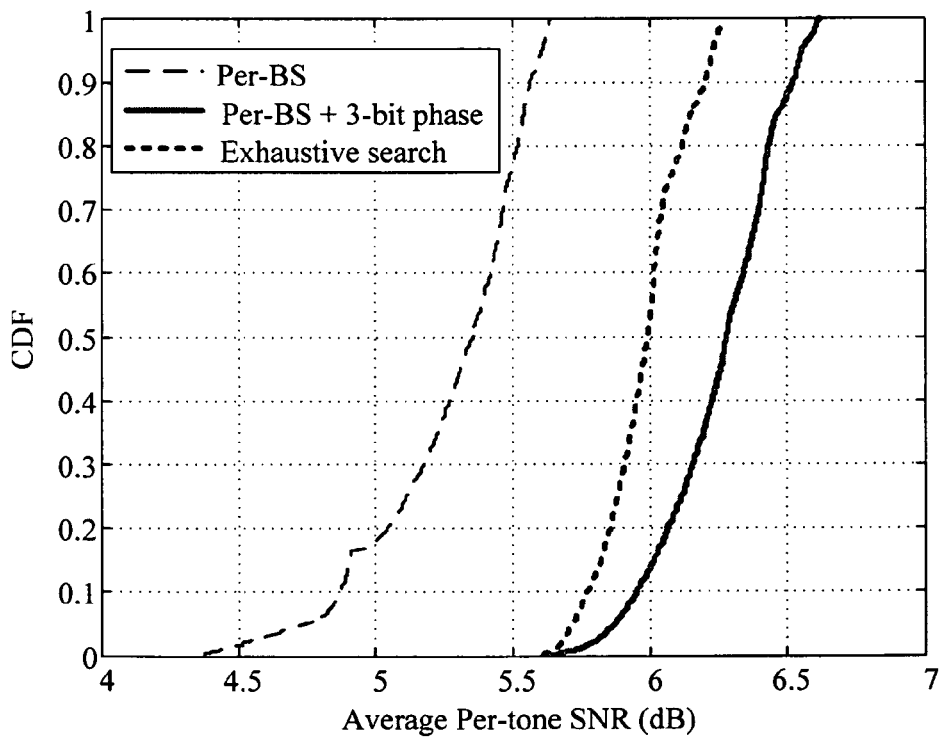

FIGS. 6A-6B illustrate simulation results for different precoding methods for OFDMA-based multi-BS MIMO systems. In both FIGS. 6A and 6B, the X-axis represents the average SNR per-tone, and the Y-axis represents the cumulative distribution function (CDF), which denotes the percentage of the data tones that exceed a specific SNR value. FIG. 6A illustrates three performance curves of three precoding methods. A dashed line represents the performance of a precoder with PMI selection using per-BS based search (individual optimization); a dotted line represents the performance of a precoder with PMI selection using exhaustive search (joint optimization); and a solid line represents the performance of a concatenated precoder with both PMI and weight factor selection, where the PMI is selected using individual optimization, and the weight factors are selected using the 2-bit uniform phase quantization table illustrated in FIG. 4A. For the precoding method with per-BS based search, the MS respectively chooses the best precoder for each BS via searching from 16×3=48 combinations. For the precoding method with exhaustive search, the MS needs to try 16×16×16=4096 combinations to find the best precoder. It can be seen that the precoder with individual optimization has the least computation complexity but lowest system performance. On the other hand, the precoder with joint optimization produces good system performance at the cost of computation complexity.

For the concatenated precoding method (PMI plus 2-bit weight factor), the MS respectively chooses the best precoder for each BS via searching from 16×3=48 combinations for PMI selection, and then determines two weight factors from $(2^2)^3=64$ search points. When the 2-bit uniform phase quantization table of FIG. 4A is used for the value of b, its corresponding phase adjustment information is derived from $e^{j2\pi b}$. It can be seen that the novel concatenated precoding method leads to large performance gain as compared to the precoding method with per-BS search.

Similarly, FIG. 6B also illustrates three performance curves for three precoding methods. The dashed line and the dotted line are the same as the dashed line and dotted line in FIG. 6A, while the solid line is similar to the solid line in FIG. 6A, but the weight factors are selected using the 3-bit uniform phase quantization table illustrated in FIG. 4B. For this concatenated precoding method (PMI plus 3-bit weight factor), the MS respectively chooses the best precoder for each BS via searching from 16×3=48 combinations for PMI selection, and then determines two weight factors from $(2^3)^3=512$ search points. It can be seen that this novel concatenated precoding method leads to further performance enhancement when the number of quantization bits increases from two bits to three bits. In fact, the average SNR per-tone using this concatenated precoding with 3-bit uniform phase quantization already exceeds the average SNR per-tone using precoding with exhaustive search. In addition, computation complexity remains much lower as compared to the exhaustive search approach.

With the novel concatenated precoder, the MS can avoid exhaustive search to find PMIs by jointly considering all cooperative BSs. Instead, the MS can use individual or step-by-step optimization to reduce computation complexity. The MS then uses weight factors to adjust the signal phase of each BS and let the signals from cooperative BSs be coherently combined. Because weight factors are quantized based on system requirements, searching space would not be large. In addition, no new multi-BS codebook is needed because existing codebook can be re-used to further enhance performance. It is also noted that although joint optimization approach produces good performance at the cost of computation complexity, it still cannot guarantee coherent signal combination at the MS, because the PMIs cannot exactly match each channel. On the other hand, weight factors provide additional degrees-of-freedom for performance enhancement, with reasonable feedback overhead for each neighboring BS.

In one or more exemplary embodiments, the functions described may be implemented in hardware, software, firmware, or any combination thereof. If implemented in software, the functions may be stored on or transmitted over as one or more instructions or code on a computer-readable (processor-readable) medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that both can be used to carry or store desired program code in the form of instructions or data structures and can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media.

Although the present invention has been described in connection with certain specific embodiments for instructional purposes, the present invention is not limited thereto. For example, while the concatenated precoding method is illustrated mainly based on Rank-1 CL-MD multi-BS MIMO with three neighboring BSs, it may also be applied in other OFDMA-based wireless communication systems with more than one transmission rank and more than three neighboring BSs. Accordingly, various modifications, adaptations, and combinations of various features of the described embodiments can be practiced without departing from the scope of the invention as set forth in the claims.

What is claimed is:

1. A method comprising:
determining a precoding matrix index (PMI) for a serving base station and one or more cooperative base stations by a mobile station to optimize system performance for multi-BS multiple-input multiple-output (MIMO) in a cellular orthogonal frequency division multiple access (OFDMA) system;
determining a plurality of corresponding weight factors based on a predefined quantization rule for each of the base stations to further optimize system performance, wherein each weight factor is represented by a number of digits; and
transmitting the PMI and the weight factors to the serving base station, wherein the PMI and the weight factors are shared between the serving base station and at least one of the one or more cooperative base stations.

2. The method of claim 1, wherein the PMI is determined for each of the base stations individually, and wherein each precoding weight is selected from a predefined codebook based on Channel Stated Information (CSI).

3. The method of claim 1, wherein each weight factor is a real number represented by the number of digits, and wherein the real number indicates a precoding power of a base station.

4. The method of claim 1, wherein each weight factor is a complex number represented by the number of digits, and wherein the complex number indicates a precoding phase of a base station.

5. The method of claim 4, wherein the number of digits is equal to three.

6. The method of claim 1, wherein each weight factor is a real number multiplied a complex number, wherein the real number is represented by a first number of digits and the complex number is represented by a second number of digits.

7. The method of claim 1, wherein the weight factors are determined based on the predefined quantization rule having a first number of digits, wherein each weight factor is a complex number represented by a second number of digits, and wherein the second number is substantially smaller than the first number.

8. The method of claim 1, wherein system performance is optimized based on at least one of capacity maximization, signal to interference plus noise power ratio (SINR) maximization, and signal power maximization.

9. A mobile station, comprising:
a precoder that determines a precoding matrix index (PMI) for a serving station and one or more cooperative base stations to optimize system performance for multi-BS multiple-input multiple-output (MIMO) in a cellular orthogonal frequency division multiple access (OFDMA) system, wherein the precoder also determines a plurality of corresponding weight factors based on a predefined quantization rule for each of the base stations to further optimize system performance, wherein each weight factor is represented by a number of digits; and
a transmitter that transmits the PMI and the weight factors to the serving base station, wherein the PMI and the weight factors are shared between the serving base station and the one or more cooperative base stations.

10. The mobile station of claim 9, wherein the PMI is determined for each of the base stations individually, and wherein each precoding weight is selected from a predefined codebook based on Channel Stated Information (CSI).

11. The mobile station of claim 9, wherein each weight factor is a real number represented by the number of digits, and wherein the real number indicates a precoding power of a base station.

12. The mobile station of claim 9, wherein each weight factor is a complex number represented by the number of digits, and wherein the complex number indicates a precoding phase of a base station.

13. The mobile station of claim 12, wherein the number of digits is equal to three.

14. The mobile station of claim 9, wherein each weight factor is a real number multiplied a complex number, wherein the real number is represented by a first number of digits and the complex number is represented by a second number of digits.

15. The mobile station of claim 9, wherein the weight factors are determined based on the predefined quantization rule having a first number of digits, wherein each weight factor is a complex number represented by a second number of digits, and wherein the second number is substantially smaller than the first number.

16. The mobile station of claim 9, wherein system performance is optimized based on at least one of capacity maximization, signal to interference plus noise power ratio (SINR) maximization, and signal power maximization.

17. A non-transitory computer-readable medium storing instructions that, when executed by a processor, cause the processor to perform a method, the method comprising:
determining a precoding matrix index (PMI) for a serving base station and one or more cooperative base stations by a mobile station to optimize system performance for multi-BS multiple-input multiple-output (MIMO) in a cellular orthogonal frequency division multiple access (OFDMA) system;
determining a plurality of corresponding weight factors based on a predefined quantization rule for each of the base stations to further optimize system performance, wherein each weight factor is represented by a number of digits; and
transmitting the PMI and the weight factors to the serving base station, wherein the PMI and the weight factors are shared between the serving base station and at least one of the one or more cooperative base stations.

18. The non-transitory computer-readable medium of claim 17, wherein the PMI is determined for each of the base stations individually, and wherein each precoding weight is selected from a predefined codebook based on Channel Stated Information (CSI).

19. The non-transitory computer-readable medium of claim 17, wherein each weight factor is a complex number represented by the number of digits, and wherein the complex number indicates a precoding phase of a base station.

20. The non-transitory computer-readable medium of claim 17, wherein system performance is optimized based on at least one of capacity maximization, signal to interference plus noise power ratio (SINR) maximization, and signal power maximization.

\* \* \* \* \*